United States Patent Office 3,553,276
Patented Jan. 5, 1971

3,553,276
C8-ALKYLAROMATIC ISOMERIZATION PROCESS
Charles V. Berger, Western Springs, and Charles S. Brearley, Chicago, Ill., assignors to Universal Oil Products Company, Des Plaines, Ill., a corporation of Delaware
No Drawing. Filed Apr. 4, 1969, Ser. No. 813,728
Int. Cl. C07c 15/06, 15/08, 5/24
U.S. Cl. 260—668
9 Claims

ABSTRACT OF THE DISCLOSURE $C_8$-naphthene loss in a recycle $C_8$-alkylaromatic isomerization process is substantially lowered by controlling the presence of toluene in the reactor recycle feed thereby allowing efficient separation and removal of the toluene produced in each cycle through the reactor without excessive loss of the naphthenes.

BACKGROUND OF INVENTION

This invention relates to a $C_8$-alkylaromatic isomerization process. More particularly, this invention relates to an improved $C_8$-alkylaromatic isomerization process wherein by-product toluene may be efficiently removed from the process without incurring excessive $C_8$-alkylnaphthene loss.

Processes for the production of the various $C_8$-alkylaromatic isomers have acquired significant interest and importance within the petroleum and petrochemical industries. This interest stems from the demand for intermediates, such as para-xylene, for the synthetic fiber and fabric industry.

Currently para-xylene is produced mainly by the isomerization of the isomeric $C_8$-aromatic hydrocarbons, namely ortho-xylene, meta-xylene, and ethylbenzene, or nonequilibrium mixtures thereof, into the para-xylene isomer. This isomerization is commonly effected by contacting the hydrocarbon, in admixture with hydrogen, with a dual function catalyst possessing both hydrogenation and cracking activities thereby effecting the desired isomerization reaction. This reaction is typically effected at temperatures of about 0° C. to about 700° C., pressures of about atmospheric to 100 atmospheres or more, and hydrogen to hydrocarbon mole ratios of about 0.5 to about 25 or more. By contacting the $C_8$-aromatic or mixture of $C_8$-aromatics with an isomerization conditions, para-xylene is formed which is separated from the unconverted $C_8$-aromatics which are then recycled back to the isomerization reaction.

In some of these processes, particularly those employing high ethylbenzene content feedstocks, alkyl cyclopentanes, and alkylcyclohexanes are formed by the hydrogenation of the $C_8$-aromatics along with by-product toluene formed by undesired decomposition and side reactions.

In these processes, wherein naphthenes and toluene are formed, it is desirable to recycle the naphthenes along with unconverted $C_8$-aromatics to the isomerization reactor. It appears that these $C_8$-naphthenes exist in equilibrium with the $C_8$-alkylaromatics, for their presence in the isomerization reactor limits, if not eliminates, the production of additional amounts of these $C_8$-naphthenes by the hydrogenation and subsequent isomerization of $C_8$-alkylaromatics. However, the toluene produced in the isomerization reactor is an irreversible by-product which must be ultimately removed from the reaction system since it otherwise would accumulate. Unfortunately, in these prior art processes wherein these naphthenes and toluene are formed, elimination of all the toluene present in the reactor effluent results in the elimination of a portion of the naphthenes formed because the relative volatility of some of the various $C_8$-naphthene isomers is in close proximity to the relative volatility of toluene. Thus, these naphthenes removed with the toluene can be recovered only through the use of intricate, expensive, and additional distillation techniques.

SUMMARY OF THE INVENTION

Accordingly, it is an object of this invention to provide a more efficient $C_8$-alkylaromatic isomerization process. More particularly, it is an object of this invention to provide a $C_8$-alkylaromatic isomerization process wherein the toluene produced in each cycle through the reactor can be effectively separated from the $C_8$-naphthenes which are to be recycled to the reactor, thereby avoiding excessive naphthene loss. As used herein, the amount of toluene produced in each cycle through the reactor refers to the difference between the amount of toluene in the reactor effluent and the amount in the reactor feed. For example, in present recycle $C_8$-aromatic isomerization processes, the reactor effluent contains toluene, naphthenes, and $C_8$-aromatics. From this mixture, specific xylenes are recovered as product, unconverted $C_8$-aromatics and naphthenes are recovered and recycled to the reactor, and relatively all the toluene present in the reactor effluent is removed.

It has now been found that by increasing the toluene level in the reactor effluent by adding toluene to the reactor through the recycle stream, the toluene produced in each cycle through the reactor can be effectively removed from the naphthenes to be recycled. While this increased toluene level may act as a diluent and lower the per pass yield, the overall effect in lowering naphthene loss more than offsets any dilution effect the toluene may have and results in an increased per pass yield of $C_8$-aromatic product.

This increased amount of toluene can be attained by initially not removing toluene from the process and allowing the toluene to build up in the unconverted xylene-naphthene recycle stream, thus feeding toluene to the isomerization reactor. When this amount of toluene reaches the hereinafter described predetermined level, the amount of toluene produced in each pass through the reactor can be efficiently removed from the process with decreased naphthene loss. The remaining unremoved toluene is then continuously recycled, allowing continuous removal of toluene produced within the process with minimum naphthene loss.

In an embodiment, this invention provides an improvement in a process for isomerizing a $C_8$-alkylaromatic hydrocarbon in contact with an isomerization catalytic composite in an isomerization zone maintained at isomerization conditions, in which process toluene and $C_8$-naphthenes are produced which naphthenes are recycled to said isomerization zone and which toluene is removed from said process in a fractionation zone wherein said toluene is not readily separated from said naphthenes without loss of naphthenes, the improvement which comprises recycling toluene to said isomerization zone to maintain a toluene concentration to said fractionation zone of about 2 to about 20 times that amount of toluene produced in each cycle through said isomerization zone which must be removed in said fractionation zone to prevent an increase in the toluene concentration in said process whereby said amount of toluene can be removed in said fractionation zone without excessive $C_8$-naphthene loss.

In more limited embodiments, the $C_8$-naphthene concentration in said isomerization zone is from about 3 to about 12 mole percent and said toluene concentration to said fractionation zone is about 0.5 mole percent to about 5.0%.

In a more particular embodiment, the catalytic composite used in this invention comprises alumina having combined therewith a Group VIII metallic component and a halogen component.

Other objects and embodiments referring to alternative toluene concentrations, catalytic composites, and processing conditions will be found in the following further detailed description of this invention.

DESCRIPTION OF PREFERRED EMBODIMENTS

The improvement of this invention is applicable to any $C_8$-aromatic isomerization process wherein it is desirable to recycle $C_8$-naphthenes produced in the process to the isomerization reactor to prevent $C_8$-aromatic loss via hydrogenation. The process feed may be a hydrocarbon fraction containing any one or a mixture of the various $C_8$-aromatic isomers, namely meta-xylene, para-xylene, ortho-xylene, and ethylbenzene, wherein the object of the process is to produce at least one of the particular xylene isomers. Typically, the object of the process is to produce para-xylene, but production of ortho-xylene, meta-xylene, or any combination of two of the xylenes is also within the scope of this invention. Thus, the process feed may be any one of the individual xylene isomers or a mixture of said isomers in which the composition of the mixture is other than the equilibrium proportion. Obviously, the feedstock to the isomerization reactor has a composition such that the proportion of specific xylene to be produced is below the equilibrium value. The $C_8$-feedstock may contain hydrocarbons such as paraffins and may be derived from gasoline range petroleum fractions such as those produced in catalyzed cracking, reforming, or hydroforming reactions in accordance with procedures well known in the art.

As hereinbefore mentioned, the improvement of this invention applies to these processes wherein it is desirable to remove toluene from the process and recycle naphthenes to the isomerization reactor. These naphthenes are produced by the hydrogenation of the $C_8$-aromatics, of which some naphthenes are subsequently isomerized. These naphthenes consist of the various alkylcyclopentanes and alkylcyclohexanes such as 1,1,3-trimethylcyclopentane, 1,1,2-trimethylcyclopentane, the 1,2,4-trimethylcyclopentanes, the 1,2,3-trimethylcyclopentanes, 1,1-dimethylcyclohexane, 1,4-dimethylcyclohexane, the methylethylcyclopentanes, etc. It is advantageous to recycle these naphthenic hydrocarbons back to the isomerization reactor thereby avoiding any future aromatic losses to naphthenes, since it appears that these naphthenes exist in equilibrium with the $C_8$-aromatics. In aparticular, it has been found that by maintaining a naphthene concentration of about 3 mole percent to about 12 mole percent, preferably about 5 mole percent to about 10 mole percent, in the isomerization reactor by recycling naphthenes to the reactor, aromatic losses via hydrogenation of the fresh feed are essentially eliminated.

These naphthenes are typically produced in processes wherein a hydrogenation component, such as a Group VI–B, VII–B and/or VIII metallic component is present as an active catalytic ingredient. These metallic components are usually combined with, or impregnated on, an acidic inorganic oxide such as alumina, silica-alumina, the faujasites, mordenite, etc., or various combinations thereof in an amount, calculated on an elemental basis, of about 0.05 to about 5.0 wt. percent of the composite. In addition, the catalysts may contain small amounts of halogen, such as from about 0.3 to about 5.0 wt. percent of the catalyst, such as chlorine and/or fluorine, to enhance the catalytic benefit of the catalyst or, even further, such halogens may be continuously passed to the isomerization reactor in admixture with the $C_8$-aromatic feedstock. An example of a particular catalytic composite which catalyzes the formaion of $C_8$-naphthenes in an isomerization process is alumina having combined therewith, about 0.05 to about 5.0 wt. percent Group VIII metallic component, particularly about 0.1 to about 1.5 wt. percent platinum or palladium, or compounds thereof, and about 0.3 to 5.0 wt. percent halogen, particularly about 0.5 to about 2.5 wt. percent fluorine and about 0.1 to about 1.5 wt. percent chlorine; all compositions calculated on an elemental basis. In addition, any of the foregoing caatlytic composites may have a sulfur component present thereon to enhance their catalytic performance in an amount, calculated on an elemental sulfur basis, of about 0.1 to about 1.0 wt. percent.

Isomerization conditions utilized in these processes wherein $C_8$-naphthenes are produced, include temperatures of about 0° C. to about 700° C., particularly about 200° C. to about 600° C., liquid hourly space velocities (volume of hydrocarbons passed per hour per volume of catalyst) of about 1 to about 40 hr.$^{-1}$, pressures of about atmospheric to about 100 atmospheres or more, and hydrogen to hydrocarbon mole ratios of about 0.5:1 to about 25:1 or more.

The method of recovering the $C_8$-isomer product from the reactor effluent is a function of the particular isomer desired. For example, if ortho-xylene is the desired product, it may be separated from the other isomers by fractional distillation since its boiling point is sufficiently highher than the boiling point of the other $C_8$-aromatic isomers to permit effective separation by conventional distillation techniques. The remaining isomers can then be subjected to further isomerization by recycling them to the isomerization reactor. However, the meta- and para-isomers are not readily separated from each other by distillation techniques because of their essentially identical boiling points. They can be separated from each other by chemical separation techniques well known to the art such as HF—$BF_3$ extraction, sulfuric acid sulfonation, alkylation-dealkylation techniques, etc. In addition, para-xylene may be recovered by physical separation methods such as crystallization or molecular sieve sorbents.

Irrespective of the particular xylene isomer desired to be produced, the toluene produced in the isomerization reaction must be eventually removed from the process since it is an irreversible by-product produced at a relatively constant rate within the isomerization reactor which will, if not removed, build up in the recycle xylene stream and act as a diluent within the isomerization reactor. Since the toluene has an appreciably lower boiling point than any of the $C_8$-aromatics, it is easily separated by distillation techniques; but, unfortunately, as hereinbefore described, the boiling points of some of the naphthenes produced fall within close proximity of toluene.

However, by using the embodiments of this invention, namely, maintaining a toluene concentration in the fractionation zone wherein toluene is removed of about two to about twenty times that amount of toluene that must be removed in said zone to prevent an increase in the toluene concentration within the system, this amount of toluene may be removed without removing excessive amounts of naphthenes. In other words, if based on 100 moles of $C_8$-aromatic feedstock 0.5 mole of toluene are produced in the isomerization reactor and no toluene is removed in the xylene recovery section, a concentration of about 1.0 to about 10.0 mole percent toluene in the reactor effluent will allow removal, by fractional distillation, of the 0.5 mole of toluene without excessive naphthene loss. If, however, 0.25 mole of toluene are removed by means other than fractional distillation such as molecular sieves or chemical separations in the xylene recovery section, the concentration of toluene in the reactor effluent will be lowered to about 0.5 to about 5.0 mole percent to allow efficient separation by fractional distillation without excessive naphthene loss. By maintaining the toluene concentration in this fractionation zone at these increased amounts as herein described, particularly between about 0.5 to about 5.0 mole percent, the effect of toluene dilution of the $C_8$-aromatic reactants is more than offset by the decreased aromatic losses resulting from the diminished naphthene losses.

In a typical $C_8$-aromatic isomerization process flow for producing para-xylene and ortho-xylene from a mixed non-equilibrium $C_8$-aromatic feedstock utilizing the embodiments of this invention, the amount of toluene produced in the reactor not removed elsewhere in the process, is first separated, in a first fractionation column, by taking this toluene, in admixture with other light ends, overhead and removing the $C_8$-aromatics, naphthene, and remaining toluene as bottoms. From these bottoms toluene, meta-xylene, para-xylene, and naphthenes are removed as overhead in a second fractionation column and ortho-xylene is removed as bottoms and further purified to render a substantially pure ortho-xylene product. The second fractionation column overhead is then subjected to a physical separation such as crystallization or molecular sieve adsorption to recover para-xylene product with the remaining xylene, naphthenes, and toluene being recycled to the isomerization reactor. As is known to those cognizant of the $C_8$-aromatic isomerization art, various modifications of the foregoing process flow are available. For example, the light ends and toluene need not be first separated from the reactor effluent in a first fractionation zone but may be removed at a later step in the product recovery. In any event, whatever particular process flow is employed, these light ends and toluene are eventually separated from the $C_8$-aromatics and naphthenes in a fractionation column somewhere within the process flow.

To further illustrate the beneficial import and effectiveness of the improvement of this invention, the following example is presented. This example is, however, not presented for purposes of limiting the scope of this invention but in order to further illustrate the embodiments thereof.

EXAMPLE

To illustrate the beneficial effect increasing the toluene concentration has an avoiding $C_8$-naphthene loss, three commercial isomerization reactor effluents, stabilized by the removal of hydrogen and light hydrocarbons such as methane, ethane, etc., are subjected to a continuous fractional distillation in a commercial distillation column equivalent to 30 theoretical plates at a reflux to feed ratio of 1.0:1.0.

The composition of the feed is identical except in the amount of toluene present. In case A, 0.25 mol of toluene are present; in case B, 0.50 mole; and, in case C, 2.50 moles. In each case, the objective is to remove 0.25 mole of toluene, produced in the reactor, namely the difference between the amount of toluene entering the reactor and the amount in the stabilized effluent. The results obtained are presented in the following table wherein all compositions represent mole/hour feed rate.

TABLE

| Component | Feed (moles) | Moles overhead A | B | C |
|---|---|---|---|---|
| Toluene | (1) | .25 | .25 | .25 |
| Benzene | .30 | .30 | .30 | .30 |
| $C_7$ saturates | 1.00 | 1.00 | 1.00 | 1.00 |
| Trimethylcyclopentanes: | | | | |
| 1,1,3 | .40 | .40 | .37 | .28 |
| 1-trans, 2-cis, 4- | .50 | .49 | .25 | .08 |
| 1-trans, 2-cis, 3- | .30 | .30 | .15 | .05 |
| 1,1,2 | .20 | .07 | .01 | (2) |
| 1-cis, 2-trans, 4- | .10 | .01 | (2) | 0.0 |
| 1-cis, 2-trans, 3- | .10 | .01 | (2) | 0.0 |
| Total | 1.60 | 1.28 | .78 | .41 |
| Other $C_8$+naphthenes, total [3] | 10.90 | .04 | .01 | .00 |
| Ethylbenzene | 61.8 | (4) | (4) | (4) |
| Para-xylene | 7.0 | (4) | (4) | (4) |
| Meta-xylene | 11.5 | (4) | (4) | (4) |
| Ortho-xylene | 5.2 | (4) | (4) | (4) |
| $C_9$+aromatics | .20 | (4) | (4) | (4) |
| Moles naphthenes lost | | 1.32 | .79 | .41 |
| Moles naphthenes lost/moles toluene removed | | 5.29 | 3.16 | 1.64 |

[1] A=.25 moles; B=.50 moles; C=2.50 moles.
[2] Trace.
[3] Includes: methylethylcyclopentanes, dimethylcyclohexanes, cyclohexanes, $C_9$+non-aromatics, etc.
[4] Negligible.

From the foregoing table, the beneficial import of this invention is readily apparent to those trained in the art. Each mole of naphthenes lost represents a potential loss of one mole of $C_8$-aromatics. By allowing the toluene present in the reactor effluent to rise to a level of about 10 times that amount of toluene produced in the isomerization reactor (Run C), an appreciable retention of $C_8$-naphthenes within the process is experienced. For example, removal of all the toluene present (Run A) results in a potential .91 mole/hr. naphthene loss as compared to a ten percent removal (Run C), while removal of half the toluene (Run B), results in a .53 mole/hr. decreased loss as compared to complete removal (Run A). Further, this increased amount of toluene shows no adverse dilution effects in the isomerization reactor since it is present in such relatively small amounts.

While at first glance a .53 to .91 mole/hr. naphthene savings and attendant aromatic savings does not appear significant, it, in fact, represents about a ½ to 1% annual aromatics savings or about 40,000 to about 80,000 pounds per year decreased aromatic loss. Thus, through using the embodiments of this invention, an improved $C_8$-alkylaromatic isomerization process results.

We claim as our invention:

1. In a process for isomerizing a $C_8$-alkylaromatic hydrocarbon in contact with an isomerization catalytic composite in an isomerization zone maintained at isomerization conditions, in which process toluene and $C_8$-naphthenes are produced which naphthenes are recycled to said isomerization zone and which toluene is removed from said process in a fractionation zone wherein said toluene is not readily separated from said naphthenes without loss of naphthenes, the improvement which comprises recycling toluene to said isomerization zone in sufficient amount to maintain a toluene concentration in the feed to said fractionation zone of about 2 to about 20 times that amount of toluene which is produced in each cycle through said isomerization zone.

2. The improvement of claim 1 wherein said naphthenes are present in said isomerization zone in a concentration of about 3 moles percent to about 12 mole percent.

3. The improvement of claim 1 further characterized in that said isomerization conditions include a temperature of about 200° C. to about 600° C., a pressure of about atmospheric to about 100 atmospheres, a liquid hourly space velocity of about 1 to about 40 hr. $^{-1}$, and a hydrogen to hydrocarbon mole ratio of about 0.5:1 to about 25:1.

4. The improvement of claim 1 further characterized in that said isomerization catalytic composite comprises alumina having combined therewith a Group VIII metallic component in an amount, calculated on an elemental basis, of about 0.05 to about 5.0 wt. percent of said composite.

5. The improvement of claim 4 wherein said catalytic composite has combined therewith fluorine or chlorine in an amount, calculated on an elemental basis, of about 0.3 to about 5.0 wt. percent of said composite.

6. The improvement of claim 4 wherein said catalytic composite has combined therewith a sulfur component in an amount calculated on an elemental sulfur basis of about 0.1 to about 1.0 wt. percent of said composite.

7. The improvement of claim 4 further characterized in that said Group VIII component is platinum, palladium, a compound of platinum, or a compound of palladium.

8. The improvement of claim 4 further characterized in that said catalytic composite comprises alumina having combined therewith, based on an elemental basis, about 0.1 to about 1.5 wt. percent platinum, about 0.1 to about 1.5 wt. percent chlorine and about 0.5 to about 2.5 wt. percent fluorine.

9. The improvement of claim 1 further characterized in that said toluene concentration in the feed to said fractionation zone is about 0.5 to about 5.0 mole percent.

(References on following page)

References Cited

UNITED STATES PATENTS

| | | | |
|---|---|---|---|
| 2,322,482 | 6/1943 | Stahly et al. | 260—683.59X |
| 2,403,785 | 7/1946 | Britton et al. | 260—671 |
| 3,078,318 | 2/1963 | Berger | 260—668 |
| 3,274,278 | 9/1966 | Kapur et al. | 260—671 |

OTHER REFERENCES

Amemiya et al.: Bulletin of the Japan Petroleum Institute, vol. 3, March 1961, pp. 14–26.

CURTIS R. DAVIS, Primary Examiner

U.S. Cl. X.R.

260—674